United States Patent
Yu et al.

(10) Patent No.: US 6,615,398 B2
(45) Date of Patent: Sep. 2, 2003

(54) METHOD FOR DIVIDING ROM AND DDFS USING THE SAME METHOD

(75) Inventors: Hyun Kyu Yu, Taejon (KR); Seon-Ho Han, Wonju-Shi (KR); Mun Yang Park, Taejon (KR); Seong-Do Kim, Taejon (KR); Yong-Sik Youn, Taejon (KR); Lee-Sup Kim, Taejon (KR); Ki-Hyuk Sung, Taejon (KR); Byung-Do Yang, Seoul (KR); Young-Jun Kim, Yongin-Shi (KR)

(73) Assignee: Electronics and Telecommunications Research Institute, Taejon (KR)

( * ) Notice: Subject to any disclaimer, the term of this patent is extended or adjusted under 35 U.S.C. 154(b) by 49 days.

(21) Appl. No.: 10/017,315

(22) Filed: Dec. 18, 2001

(65) Prior Publication Data

US 2003/0014721 A1 Jan. 16, 2003

(30) Foreign Application Priority Data

Jul. 5, 2001 (KR) ........................ 2001-39998

(51) Int. Cl.[7] ............................ G06F 17/50; G06K 9/40; H04L 27/20
(52) U.S. Cl. ............................ 716/7; 382/274; 375/308
(58) Field of Search ................ 716/1–21; 327/105–107, 327/115, 116, 141; 382/274; 375/308

(56) References Cited

U.S. PATENT DOCUMENTS

| | | | |
|---|---|---|---|
| 5,321,642 A | 6/1994 | Goldberg | |
| 5,619,535 A | * 4/1997 | Alvarez, Jr. | 375/308 |
| 5,986,483 A | 11/1999 | Yu et al. | |
| 6,404,935 B1 | * 6/2002 | Lau | 382/274 |

OTHER PUBLICATIONS

Nicholas, III, et al.; The Optimization of Direct . . . ; 42$^{nd}$ Annual Frequency Control Symposium, 1998, p. 357–363.

* cited by examiner

Primary Examiner—Leigh M. Garbowski
Assistant Examiner—Andrea Liu
(74) Attorney, Agent, or Firm—Jacobson Holman PLLC

(57) ABSTRACT

The present invention relates to a ROM division method for reducing the size of a ROM in a direct digital frequency synthesizer (DDFS), which is used to synthesize a frequency in a communication system requiring fast frequency conversion. A ROM consuming most energy in the system, a modified Nicholas architecture is brought forth to reduce the size of ROM. In this modified Nicholas architecture, a ROM is divided into coarse ROM and fine ROM to convert phase to sine value. The present invention divides the coarse ROM and the fine ROM into quantized ROM and error ROM respectively. Then, value stored in each ROM is segmented in certain intervals and the minimum quantized value in each of the section is stored in the quantized ROM, while the difference between the original ROM value and the quantized ROM value is stored in the error ROM. This way, the size of a ROM can be reduced. Phase value inputted in a DDFS, a sine value is calculated by adding the four ROM values, i.e., coarse-quantized ROM, coarse-error ROM, fine-quantized ROM and fine-error ROM.

10 Claims, 4 Drawing Sheets

METHOD FOR DIVIDING ROM AND DDFS USING THE SAME METHOD

FIELD OF THE INVENTION

The present invention relates to a method for dividing a read only memory (ROM) of a digital frequency synthesizer that synthesizes a frequency in a communication system, which can reduce a size of the ROM.

DESCRIPTION OF THE PRIOR ART

A direct digital frequency synthesizer (DDFS) is used to synthesize frequencies in a communication system requiring fast frequency conversion.

FIG. 1 is a block diagram illustrating a simplified direct digital frequency synthesizer (DDFS).

The DDFS includes a phase accumulator 11 for adding input phase and outputting a p-bit phase value, a first complementer 12 for outputting a p-2-bit phase value except the most significant bit (MSB) and the second most significant bit (and the second MSB) out of the p-2-bit phase values directly or with the help of a complement in accordance with the second most significant bit ($2^{nd}$ MSB) among the p-bit phase values, a lookup table 13 for storing m-1-bit sine value according to the phase value, and a second complementer 14 for outputting the m-1-bit sine value directly or with the help of a complement according to the MSB value among the p-bit phase values, and a digital/analog converter 15 for outputting a sine value from the second complementer 14 into an analog sine value.

A frequency value that the DDFS wants being inputted in an N-bit digital value, the DDFS outputs a sine waveform corresponding to the frequency value.

To describe the operation of the DDFS in detail, the phase accumulator 11 receives an N-bit frequency input word ($\Delta\Phi$) of, accumulates it and outputs a p-bit phase value. The p-bit phase value has a range of $0 \sim 2\pi$ rad. Among the p-bit phase values, the 1 bit of the most significant bit (MSB) determines the sign of the result, and the second MSB determines whether the sine waveform should increase or decrease. Among the output bits of the phase accumulator 11, the remaining p-2 bits except the two most significant bits are used as addresses of the ROM lookup table 13. Therefore, the p-2 bits of the phase values are in the range of $0 \sim \pi/2$ rad.

The p-2 bits of phase values are inputted to a first complementer 12, which outputs p-2-bit phase values directly if the second MSB of the p-bit phase value is 0, and if it's 1, the first complementer 12 outputs p-2-bit phase values by taking a complement of p-2-bit phase values. The values outputted from the first complementer are inputted into a ROM lookup table 13, which uses the output values of the first complementer 12 as address and outputs m-1-bit sine values. The m-1-bit sine values are inputted into the second complementer 14. The second complementer 14 outputs the m-1-bit sine values directly or by taking a complement according to the MSB value of the phase accumulator 11 among its output values. In short, if the MSB is 0, the m-1-bit sine values are outputted directly, and if it's 1, the m-1-bit sine values are outputted by taking a complement. The digital/analog converter 15 converts the output values of the second complementer 14 into analog sine waves.

The ROM lookup table 13 does not store all the sine values in the range of $0 \sim 2\pi$ but all the sine vales in the range of $0 \sim \pi/2$ in m-1 bit by using the symmetry of a sine waveform. That is, the size of the ROM lookup table 13 is $(m-1) \times 2^{p-2}$.

In the DDFS, the ROM lookup table 13 consumes electric power most, and many methods for reducing the size of a ROM lookup table, a ROM in short, have been suggested to run the ROM lookup table in low power. Among the method is a modified Nicholas architecture, which divides a ROM into two and thus reduces power consumption and the size.

When p-2-bit phase values are divided into a significant bit ($\alpha$), an intermediate bit ($\beta$) and an insignificant bit ($\gamma$), the sine value $$\sin\left(\frac{\pi}{2}(\alpha + \beta + \gamma)\right)$$

corresponding to a certain phase value ($\alpha+\beta+\gamma$) is as shown in a following equation 1.

$$\sin\left(\frac{\pi}{2}(\alpha + \beta + \gamma)\right) = \\ \sin\left(\frac{\pi}{2}(\alpha + \beta)\right)\cos\left(\frac{\pi}{2}\gamma\right) + \cos\left(\frac{\pi}{2}(\alpha + \beta)\right)\sin\left(\frac{\pi}{2}\gamma\right) \approx \\ \sin\left(\frac{\pi}{2}(\alpha + \beta)\right) + \cos\left(\frac{\pi}{2}\alpha\right)\sin\left(\frac{\pi}{2}\gamma\right) \quad \text{Eq. 1}$$

Here, the ROM is divided into a coarse ROM and a fine ROM, the value of $$\sin\left(\frac{\pi}{2}(\alpha + \beta)\right)$$

is stored in the coarse ROM, and the value $$\cos\left(\frac{\pi}{2}\alpha\right)\sin\left(\frac{\pi}{2}\gamma\right)$$

stored in the fine ROM. Thus, the size of the ROM can be reduced, and instead of $$\sin\left(\frac{\pi}{2}(\alpha + \beta)\right), \left[\sin\left(\frac{\pi}{2}(\alpha + \beta)\right) - (\alpha + \beta)\right]$$

is stored in the coarse ROM and $\alpha+\beta$ is added to it later on. Consequently, $$\left[\sin\left(\frac{\pi}{2}(\alpha + \beta)\right) - (\alpha + \beta)\right]$$

is stored in the coarse ROM and $$\cos\left(\frac{\pi}{2}\alpha\right)\sin\left(\frac{\pi}{2}\gamma\right),$$

in the fine ROM.

When a phase value ($\alpha+\beta+\gamma$) is inputted from the first complementer, a digital sine value is obtained by calculating the data of the coarse ROM and the data of the fine ROM in the following equation 2.

$$\sin\left(\frac{\pi}{2}(\alpha + \beta + \gamma)\right) \approx \left[\sin\left(\frac{\pi}{2}(\alpha + \beta)\right) - (\alpha + \beta)\right] + \\ (\alpha + \beta) + \cos\left(\frac{\pi}{2}\alpha\right)\sin\left(\frac{\pi}{2}\gamma\right) \quad \text{Eq. (2)}$$

Suggesting a method of reducing the ROM size by dividing the entire ROM into a coarse ROM and a fine ROM, the modified Nicholas architecture described above can reduce electric power consumption to what extend. However, being an element with a great deal of power consumption, the size of the ROM still has much more room to be reduced and no method has been suggested for it.

SUMMARY OF THE INVENTION

It is, therefore, an object of the present invention to provide a ROM division method for reducing power consumption and the ROM size by minimizing the size of the ROM, which is an element with most power consumption in a digital frequency synthesizer, and a digital frequency synthesizer adopting the same method.

In accordance with an aspect of the present invention, there is provided a method for dividing a read only memory (ROM), comprising the steps of: a) when an original ROM has k bits of input data (k being a natural number bigger than 1), $2^k$ numbers of input addresses, c bits of output (c being a natural number bigger than 1) and original data stored on the original ROM are divided into $2^i$ ($1 \leq i \leq k$) numbers of sections, storing the smallest value of each section in a q-bit ($1 \leq q \leq c$) quantized ROM; and b) storing in an e-bit error ROM, an the error value between the original data of the original ROM and the quantized value of the quantized ROM at all ($2^k$ numbers of) input addresses of the original ROM (e being the smallest number of bits for expressing all errors at all input address of the original ROM).

In accordance with another aspect of the present invention, there is provided a digital frequency synthesizer with a ROM lookup table that divides and stores the sine value corresponding to an input phase value into a coarse ROM and a fine ROM, adds the two ROM values and outputs the sine value corresponding to the phase value, the coarse ROM comprising: a coarse-quantized ROM for storing the smallest value of each section in q1 bits ($1 \leq q1 \leq c1$), when the coarse ROM has $2^{k1}$ (k1 being a natural number bigger than 1) numbers of input addresses and c1 numbers of output addresses (c1 being a natural number bigger than 1) and the data in the coarse ROM are divided into $2^{i1}$ ($1 \leq i1 \leq k1$) numbers of sections; and a coarse-error ROM for storing the all error values between the data value of the coarse ROM and the quantized value of the coarse-quantized ROM at all input addresses ($2^{k1}$) of the coarse ROM in e1 bits (e1 being the smallest bit number for expressing all errors at all input addresses of the coarse ROM).

In accordance with further another aspect of the present invention, there is provided a digital frequency synthesizer with a ROM lookup table that divides and stores the sine value corresponding to an input phase value into a coarse ROM and a fine ROM, adds the two ROM values and outputs the sine value corresponding to the phase value, the fine ROM comprising: a fine-quantized ROM for storing the smallest value of each section in q2 bits ($1 \leq q2 \leq c2$), when the fine ROM has $2^{k2}$ (k2 being a natural number bigger than 1) numbers of input addresses and C2 numbers of output addresses (c2 being a natural number bigger than 1) and the data in the fine ROM are divided into $2^{i2}$ ($1 \leq i2 \leq k2$) numbers of sections; and a fine-error ROM for storing the all error values between the data value of the fine ROM and the quantized value of the fine-quantized ROM at all input addresses ($2^{k2}$) of the fine ROM in e2 bits (e2 being the smallest bit number for expressing all errors at all input addresses of the fine ROM).

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Other objects and aspects of the invention will become apparent from the following description of the embodiments with reference to the accompanying drawings, which is set forth hereinafter.

Figure 1:
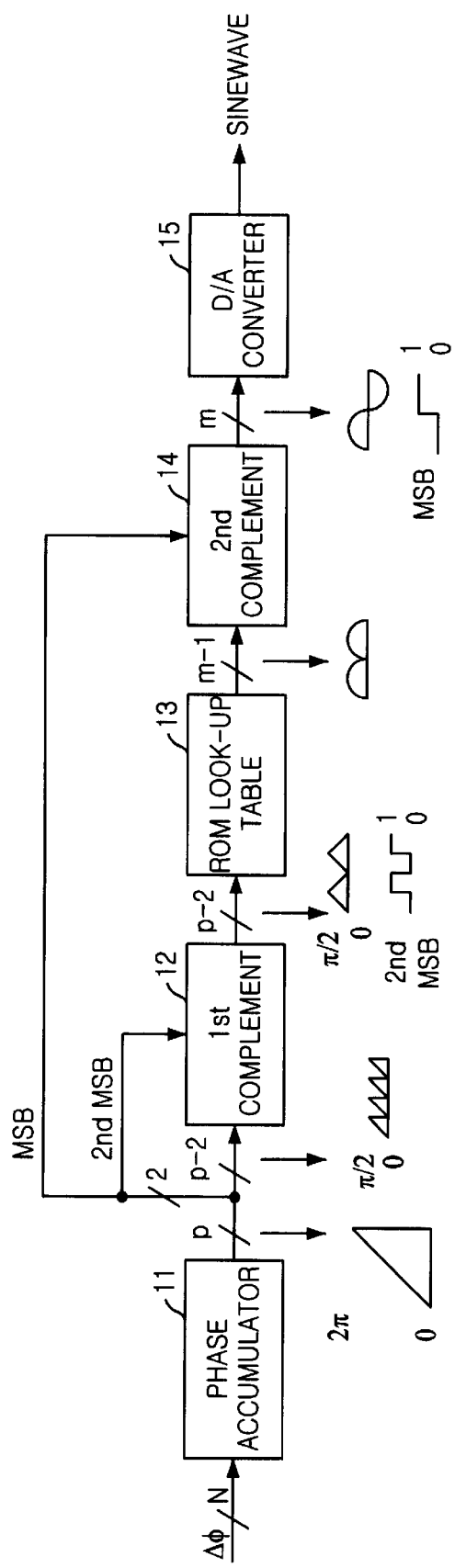
FIG. 1 is a structural diagram of a common digital frequency synthesizer.
Figure 2:
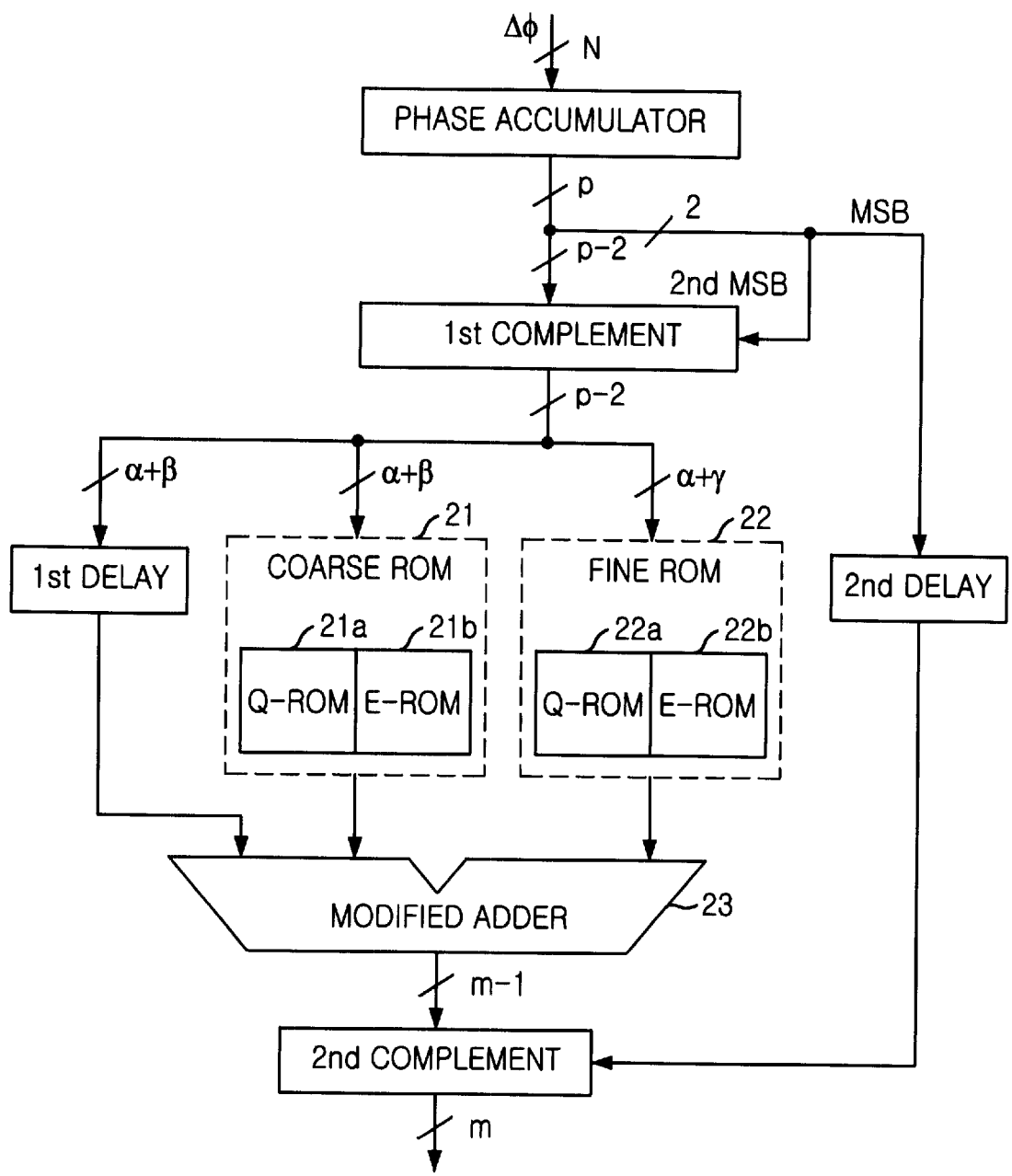
FIG. 2 is a structural diagram of a low-powered digital frequency synthesizer in an embodiment of the present invention.

FIG. 2 is a structural diagram of a low power digital frequency synthesizer in an embodiment of the present invention.

In the present invention, each of the coarse ROM 21 and the fine ROM 22 of a ROM lookup table is divided into quantized ROMs (Q-ROM) 21A, 22A and error ROMs (E-ROM) 21B, 22B. The Q-ROM stores q-bit quantized values to which data of the original ROM are quantized. The E-ROM stores an error value, i.e., a difference between values stored on the original ROM and the quantized ROM. Here, the original ROM means a ROM to be divided into a quantized ROM and an error ROM according to the ROM division method of the present invention. That is, it refers to both coarse and fine ROMs in this specification. Although the coarse ROM and the fine ROM of a DDFS is taken as an example and described to help understanding of the present invention here in this specification, any ROM is available for an original ROM in the ROM division method of the present invention.

Figure 3:
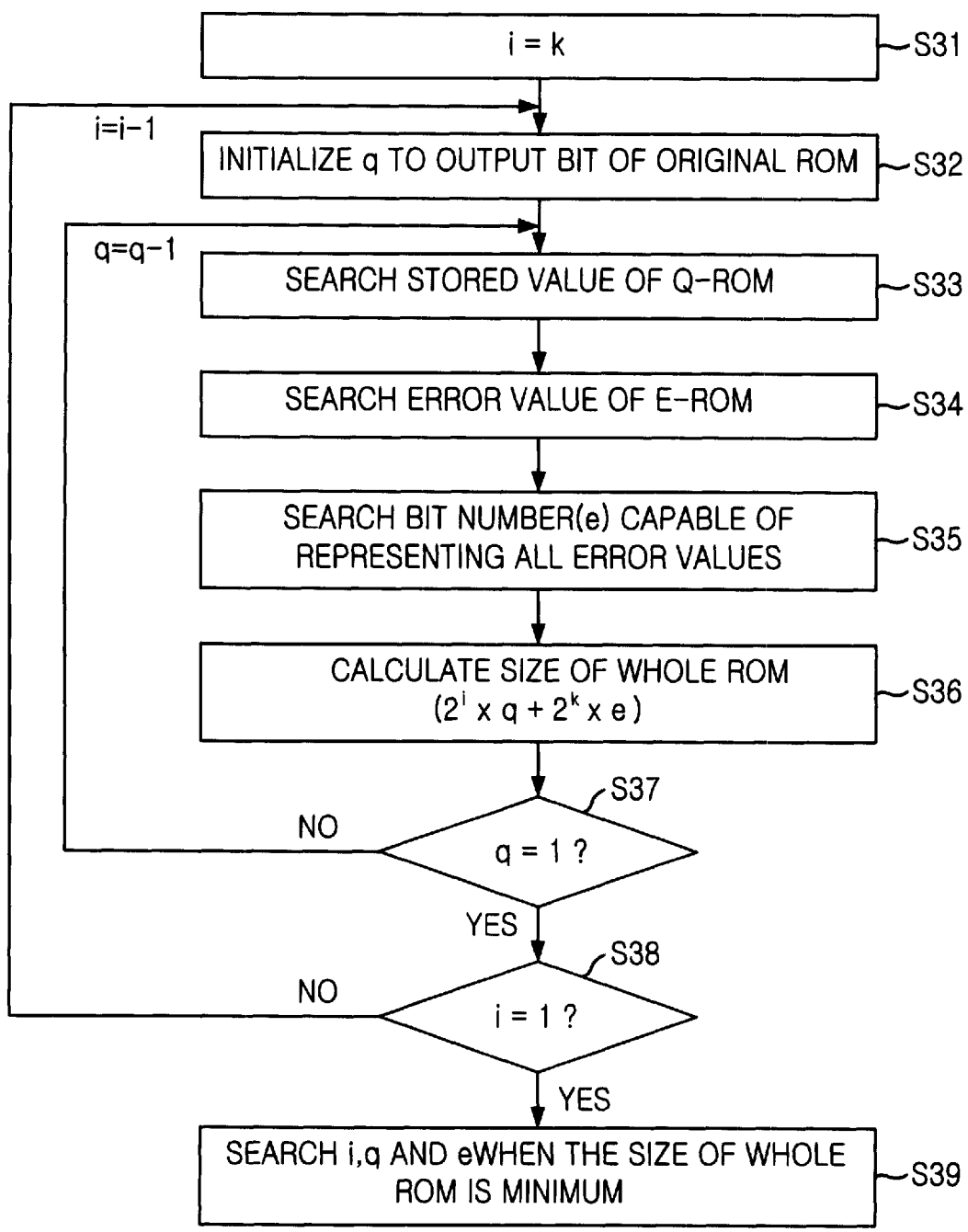
FIG. 3 is a flow chart illustrating a ROM division method in accordance with an embodiment of the present invention.

FIG. 3 is a flow chart illustrating a ROM division method in an embodiment of the present invention.

According to the ROM division method of the invention, an original ROM is divided into a quantized ROM of $2^i \times q$ bits and an error ROM of $2^k \times e$ bits. Here, the size of the entire ROM is $2^i \times q + 2^k \times e$ bits, and the values of i, q and e that minimize the total ROM size can be obtained as following. $2^i$ denotes the number of sections; q the number of bits of a quantized value for expressing smallest value of each section; $2^k$ the number of input bits of the original ROM; and e the number of minimum bit(s) for expressing all error values when the number of sections is $2^i$.

At step S31, if the original ROM the ROM division method of the present invention is applied to has $2^k$ number of input addresses and the number of sections is $2^i$, i is initialized to be k. That is, the variable i is initialized to be the bit number k of the input address of the original ROM. Also, at step S32, the variable q is initialized to be the output bit number of the original ROM.

At step S33, the ROM with $2^k$ number of input address is divided into $2^i$ number of sections and the smallest value among the significant q-bit values of each section is taken to be stored in the Q-ROM. $2^i$ number of q-bit data are stored in the Q-ROM. That is, in case of the original ROM with k bits of input addresses, the number of data stored in the original ROM is $2^k$. When the value in the original ROM is divided into $2^i$ number of sections, the size of the section is 1~$2^k$, and the number of sections is obtained by dividing $2^k$ by the size of one section, so the number of sections can be $2^k$~1. Here, when i value is increased by one, the size of the section gets twice as big, and the number of sections decreases by half.

At step S34, the difference value (error value) between the data value of the original ROM with an address and the quantized value stored in the quantized ROM corresponding to the address is obtained. Then, at step S35, e bit is determined that is the number of bits necessary for storing the largest error value among the error values in all input addresses of 1 to $2^k$. And then, at step S36 the size of the entire ROM ($2^i \times q + 2^k \times e$ bit) is calculated.

At step S37, the above steps of S33 to S36 are performed repeatedly reducing the q one by one until the q becomes 1, then at step S38 the steps of S32 to S37 are conducted repeatedly reducing i one by one until the i becomes 1.

Conducting all of the above steps, at step S39, the values of i, q and e that minimize the total ROM size are determined.

Figure 4:
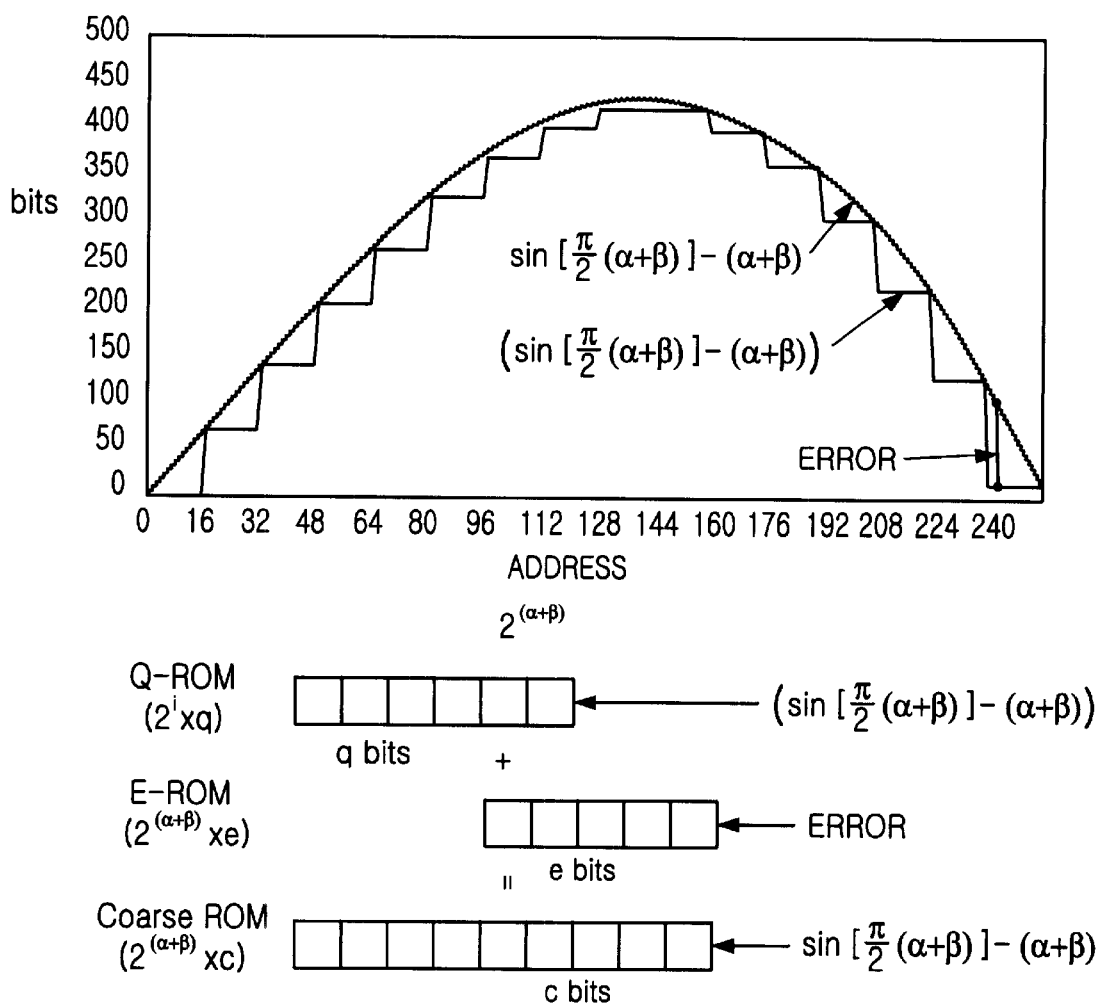
FIG. 4 is an exemplary diagram describing how to divide a coarse ROM value into a quantized ROM and an error ROM in a 12-bit-outputting DDFS.

FIG. 4 is an exemplary diagram describing how to divide a value of a coarse ROM in a 12-bit-outputting DDFS into a quantized ROM and an error ROM.

In this example, it is assumed that $\alpha=\beta=4$, the size of the coarse ROM is $2^{\alpha+\beta \times c} = 2^8 \times 7$, i=4, and the ROM is divided into 16 sections. Here, $$\sin\left(\frac{\pi}{2}(\alpha+\beta)\right) - (\alpha+\beta)$$

is stored in the coarse ROM, and in the quantized ROM of the coarse ROM, the smallest value $$\left[\sin\left(\frac{\pi}{2}(\alpha+\beta)\right) - (\alpha+\beta)\right]$$

among the significant q bits of each section is stored, while a difference value between the values stored on the coarse ROM and the quantized ROM is stored in the error ROM. Therefore, adding the quantized ROM and the error ROM, the coarse ROM can be obtained.

As described above, the present invention reduces the whole size and power consumption of the ROM by dividing a coarse ROM of a DDFS into a coarse-quantized ROM and a coarse-error ROM, and a fine ROM into a fine-quantized ROM and a fine-error ROM, thus providing a low power DDFS.

While the present invention has been described with respect to certain preferred embodiments, it will be apparent to those skilled in the art that various changes and modifications may be made without departing from the scope of the invention as defined in the following claims.

What is claimed is:

1. A method for dividing a read only memory (ROM), comprising the steps of:
   a) when an original ROM has k bits of input data (k being a natural number bigger than 1), $2^k$ numbers of input addresses, c bits of output (c being a natural number bigger than 1) and original data stored on the original ROM are divided into $2^i$ ($1 \leq i \leq k$) numbers of sections, storing the smallest value of each section in a q-bit ($1 \leq q \leq c$) quantized ROM; and
   b) storing in an e-bit error ROM, an error value between the original data of the original ROM and the quantized value of the quantized ROM at all ($2^k$ numbers of) input addresses of the original ROM (e being the smallest number of bits for expressing all errors at all input address of the original ROM).

2. The method as recited in claim 1, further comprising the steps of:
   c) determining values of the variables i, q and e that minimize the total ROM size composed of $2^i \times q$ size of a quantized ROM and $2^k \times e$ size of an error ROM; and
   d) storing the original data separately into the quantized ROM and the error ROM.

3. The method as recited in claim 2, wherein the step c) includes the steps of:
   c1) initializing i to be k and q to be c;
   c2) dividing the $2^k$ input addresses into $2^i$ numbers of sections and storing the smallest value among the significant q bit values of each section in the quantized ROM (Q-ROM) and storing in an error ROM the difference value between the values stored on the original ROM and the quantized ROM;
   c3) determining e, the number of bits necessary for storing the largest value among the difference values between values stored on the original ROM and the quantized ROM;
   c4) calculating the size of the entire ROM ($2^i \times q + 2^k \times e$) including the quantized ROM and the error ROM;
   c5) conducting the steps of f) to h) repeatedly decreasing the q one by one until the q becomes 1;
   c6) initializing q to be c by decreasing i one by one until i becomes 1, and conducting the steps of f) to i) repeatedly; and
   c7) determining the i, q and e values that minimize the size of the entire ROM obtained in the step h).

4. A digital frequency synthesizer with a ROM lookup table that divides and stores the sine value corresponding to an input phase value into a coarse ROM and a fine ROM, adds the two ROM values and outputs the sine value corresponding to the phase value, the coarse ROM comprising:
   a coarse-quantized ROM for storing the smallest value of each section in q1 bits ($1 \leq q1 \leq c1$), when the coarse ROM has $2^{k1}$ (k1 being a natural number bigger than 1) numbers of input addresses and c1 numbers of output addresses (c1 being a natural number bigger than 1) and the data in the coarse ROM are divided into $2^{i1}$ ($1 \leq i1 \leq k1$) numbers of sections; and
   a coarse-error ROM for storing the all error values between the data value of the coarse ROM and the quantized value of the coarse-quantized ROM at all input addresses ($2^{k1}$) of the coarse ROM in e1 bits (e1 being the smallest bit number for expressing all errors at all input addresses of the coarse ROM).

5. The digital frequency synthesizer as recited in claim 4, wherein the fine ROM includes:
   a fine-quantized ROM for storing the smallest value of each section in q2 bits ($1 \leq q2 \leq c2$), when the fine ROM has $2^{k2}$ (k2 being a natural number bigger than 1) numbers of input addresses and C2 numbers of output addresses (c2 being a natural number bigger than 1) and the data in the fine ROM are divided into $2^{i2}$ ($1 \leq i2 \leq k2$) numbers of sections; and
   a fine-error ROM for storing all error values between the data value of the fine ROM and the quantized value of the fine-quantized ROM at all input addresses ($2^{k2}$) of the fine ROM in e2 bits (e2 being the smallest bit number for expressing all errors at all input addresses of the fine ROM).

6. The digital frequency synthesizer as recited in claim 4, wherein the variables i1, q1 and e1 are determined as the values minimizing the total size ($2^{i1} \times q1 + 2^{k1} \times e1$) of the coarse ROM at all i1 ($1 \leq i1 \leq k1$) and q1($1 \leq q1 \leq c1$).

7. The digital frequency synthesizer as recited in claim 5, wherein the variables i1, q1 and e1 are determined as the values minimizing the total size ($2^{i1} \times q1 + 2^{k1} \times e1$) of the coarse ROM at all i1 ($1 \leq i1 \leq k1$) and q1 ($1 \leq q1 \leq c1$).

8. The digital frequency synthesizer as recited in claim 5, wherein the variables i2, q2 and e2 are determined as the values minimizing the total size ($2^{i2} \times q2 + 2^{k2} \times e2$) of the fine ROM at all i2 ($1 \leq i2 \leq k2$) and q2 ($1 \leq q2 \leq c2$).

9. A digital frequency synthesizer with a ROM lookup table that divides and stores the sine value corresponding to an input phase value into a coarse ROM and a fine ROM, adds the two ROM values and outputs the sine value corresponding to the phase value, the fine ROM comprising:

a fine-quantized ROM for storing the smallest value of each section in q2 bits ($1 \leq q2 \leq c2$), when the fine ROM has $2^{k2}$ (k2 being a natural number bigger than 1) numbers of input addresses and C2 numbers of output addresses (c2 being a natural number bigger than 1) and the data in the fine ROM are divided into $2^{i2}$ ($1 \leq i2 \leq k2$) numbers of sections; and a fine-error ROM for storing all error values between the data value of the fine ROM and the quantized value of the fine-quantized ROM at all input addresses ($2^{k2}$) of the fine ROM in e2 bits (e2 being the smallest bit number for expressing all errors at all input addresses of the fine ROM).

10. The digital frequency synthesizer as recited in claim 9, wherein the variables i2, q2 and e2 are determined as the values minimizing the total size ($2^{i2} \times q2 + 2^{k2} \times e2$) of the fine ROM at all i2 ($1 \leq i2 \leq k2$) and q2 ($1 \leq q2 \leq c2$).

* * * * *